(12) United States Patent
Xu et al.

(10) Patent No.: US 7,865,025 B2
(45) Date of Patent: Jan. 4, 2011

(54) DATA PROCESSING METHOD IN EMBEDDED BLOCK CODING WITH OPTIMIZED TRUNCATION MODULE

(75) Inventors: Ying-Jie Xu, Chia-Yi (TW); Ching-Wei Yeh, Electrical Engineering Department of CCU, 5F-5, 168 San-Hsing, Ming-Hsiung, Chia-Yi (TW); Jinn-Shyan Wang, Chia-Yi (TW)

(73) Assignee: Ching-Wei Yeh, Chia-Yi (TW)

( * ) Notice: Subject to any disclaimer, the term of this patent is extended or adjusted under 35 U.S.C. 154(b) by 1191 days.

(21) Appl. No.: 11/496,529

(22) Filed: Aug. 1, 2006

(65) Prior Publication Data

US 2008/0031532 A1 Feb. 7, 2008

(51) Int. Cl.
*G06K 9/36* (2006.01)
(52) U.S. Cl. .................. 382/234; 382/247
(58) Field of Classification Search ............ 382/234
See application file for complete search history.

(56) References Cited

U.S. PATENT DOCUMENTS

| | | | | |
|---|---|---|---|---|
| 5,659,631 A * | 8/1997 | Gormish et al. | ............ | 382/166 |
| 5,689,589 A * | 11/1997 | Gormish et al. | ............ | 382/239 |
| 5,764,374 A * | 6/1998 | Seroussi et al. | ............ | 382/244 |
| 6,133,955 A * | 10/2000 | Han | ............ | 375/240.16 |
| 6,188,795 B1 * | 2/2001 | Brady et al. | ............ | 382/239 |
| 6,285,790 B1 * | 9/2001 | Schwartz | ............ | 382/234 |
| 6,351,569 B1 * | 2/2002 | Kimura et al. | ............ | 382/247 |
| 6,448,910 B1 * | 9/2002 | Lu | ............ | 341/51 |
| 6,522,783 B1 * | 2/2003 | Zeng et al. | ............ | 382/239 |
| 6,832,005 B2 * | 12/2004 | Malvar | ............ | 382/238 |
| 7,305,138 B2 * | 12/2007 | Hirao | ............ | 382/247 |
| 7,450,770 B2 * | 11/2008 | Chen et al. | ............ | 382/234 |
| 2002/0114529 A1 * | 8/2002 | Horie | ............ | 382/247 |
| 2004/0070526 A1 * | 4/2004 | Horie | ............ | 341/107 |
| 2004/0101205 A1 * | 5/2004 | Dhavala et al. | ............ | 382/247 |
| 2004/0114810 A1 * | 6/2004 | Boliek et al. | ............ | 382/232 |
| 2004/0240559 A1 * | 12/2004 | Prakasam et al. | ...... | 375/240.25 |
| 2005/0232505 A1 * | 10/2005 | Pearson et al. | ............ | 382/247 |
| 2006/0083436 A1 * | 4/2006 | Malvar | ............ | 382/238 |
| 2006/0233257 A1 * | 10/2006 | Keith et al. | ............ | 375/240.19 |
| 2006/0233444 A1 * | 10/2006 | Chang et al. | ............ | 382/232 |
| 2007/0019867 A1 * | 1/2007 | Kwon et al. | ............ | 382/232 |
| 2008/0031532 A1 * | 2/2008 | Xu et al. | ............ | 382/238 |
| 2009/0154818 A1 * | 6/2009 | Stefanov et al. | ............ | 382/239 |

\* cited by examiner

*Primary Examiner*—Sath V Perungavoor
(74) *Attorney, Agent, or Firm*—Rosenberg, Klein & Lee

(57) ABSTRACT

A data processing method for a context formation module and an arithmetic encoder in an embedded block coding with optimized truncation (EBCOT) module includes inputting column-based data into the context formation module, controlling the context formation module with a finite state so that the context formation module has a constant valid output in each clock cycle, separating the calculation and the normalization operation of registers into different pipeline stages of the arithmetic encoder, and interleaving inputs so that two different data are inputted into the arithmetic encoder in one clock cycle difference.

20 Claims, 3 Drawing Sheets

DATA PROCESSING METHOD IN EMBEDDED BLOCK CODING WITH OPTIMIZED TRUNCATION MODULE

BACKGROUND

1. Field of Invention

The present invention relates to a data processing method for a context formation module and an arithmetic encoder. More particularly, the present invention relates to a data processing method for a context formation module and an arithmetic encoder in an embedded block coding with optimized truncation (EBCOT) module.

2. Description of Related Art

In recent years, networks are increasingly more popular, and images, audio, and other multimedia data are getting bigger and bigger. So, the new compression technology for those data becomes very important.

JPEG2000 image compression technology is a new international image compression standard and also the latest image encoding technology after JPEG. The JPEG2000 image compression technology also provides higher resolutions. Moreover, it further has several advantages such as a high compression rate, supporting lossy and lossless compression, progressive transmission, and region-of-interest coding. For entropy coding, embedded block coding with optimized truncation (EBCOT) is used in JPEG2000 rather than the VLC/VLD in JPEG. Since the scalable encoding of EBCOT enables progressive transmission and bandwidth adaptation, EBCOT is used to achieve the optimized image quality.

In EBCOT, the most important parts are the context formation (CF) and the arithmetic encoder (AE). The CF module is used to process each bit within a code-block sequentially to generate the context and decision pairs, rather than to compress the data. In the CF module, each bit is checked and coded, and its context is generated according to the status of its neighbors. On the other hand, the arithmetic encoder is used to encode each bit according to the contexts, and output the bit-streams of each compressed code-block data.

Regarding the CF module data processing method in the prior art, each bit is inputted continuously and a first-in first-out (FIFO) buffer is placed between the CF module and the arithmetic encoder. But it is not good enough. If the CF module cannot generate the valid context and decision pairs continuously, the arithmetic encoder cannot encode the data efficiently. Besides, if the CF module outputs too many context and decision pairs at a time, an additional FIFO buffer has to be placed between the CF module and the arithmetic encoder to temporarily store the context and decision pairs which can not be processed immediately. In this method, the CF module cannot have a valid output in each clock cycle, so the optimal performance cannot be attained. Moreover, the capacity of the FIFO buffer has to be big enough so that the production cost must be increased. For the forgoing reasons, there is a need for solving problems with a new data processing method for the CF module.

FIG. 1 is a schematic view showing a four-stage pipelined arithmetic encoder in the prior art. The arithmetic encoder can be partitioned into two parts, (1) the probability estimation (PE), and (2) the calculation and the normalization of the 16-bit A-register and 28-bit C-register, and index and MPS updating (IMU) as well. In order to shorten the critical path, the C-register is usually divided into two parts, a 16-bit C-register and a 12-bit C-register, respectively. Because the arithmetic encoder is a key of EBCOT, the pipelined architecture for the arithmetic encoder is a necessary technique to speed up the performance.

In the pipelined architecture of the arithmetic encoder, if the context and decision pairs are processed continuously in one coding pass, the normalization operation of the 16-bit A-register has to be performed immediately. Because the data is random, generating the context and decision pairs in the same coding pass cannot be avoided, even the data are processed under the pass parallel mode. In this situation, if the calculation and the normalization operation are performed during different pipeline stages, the 16-bit A-register will not complete the normalization operation in time. Thus, a bubble is needed between two successive inputs, meaning that one clock cycle has to be wasted when using this method. Although a look-ahead approach is adopted to solve the problem, it is too complicated. So the problem is definitely the bottleneck for the arithmetic encoder. For the forgoing reasons, there is a need for solving problems with a new data processing method for the arithmetic encoder, so as to speed up the arithmetic encoder and cut down the production cost.

SUMMARY

An object of the present invention is to provide a data processing method for the context formation (CF) module in EBCOT, so as to speed up the CF task.

Another object of the present invention is to provide a data processing method for the arithmetic encoder (AE) in EBCOT, so as to attain an optimal pipelined architecture of the arithmetic encoder and cut down the production cost.

In accordance with the foregoing objective of the present invention, a data processing method for the CF module is provided. The CF module processes the code-blocks and outputs the data with a constant output rate. As embodied and broadly described herein, column-based data are inputted into the CF module in order to check each bit coded in the coding passes. After that, a finite state machine (FSM) controller is provided to control the CF module to make the CF module continuously output a valid context and decision pair in each clock cycle, wherein the constant output-rate CF module includes a variable abstract device, a parallel pass classification device, a parallel contribution calculation device, a context and decision pair mapping device, a line buffer, and a FSM controller. Thus, the additional FIFO buffer is not necessary anymore. And the objectives for increasing the performance and cutting down the cost can be both achieved.

In accordance with another foregoing objective of the present invention, the data processing method for the arithmetic encoder is provided. An optimal pipelined architecture can be obtained and the production cost can be saved. As embodied and broadly described herein, the calculation and the normalization operation of registers are separated into the different pipeline stages. Besides, the inputs are interleaved so that two different data can be inputted into the arithmetic encoder in one clock cycle difference. Therefore, not only each clock cycle can be used efficiently, but also the look-ahead approach is not necessary anymore, and the cost can be saved as well.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Detailed illustrative embodiments of the present invention are disclosed herein. However, specific details disclosed herein are merely representative for purposes of describing exemplary embodiments of the present invention. This invention may, however, be embodied in many alternate forms and should not be construed as limited to the embodiments set forth herein.

The present invention provides a data processing method for the context formation (CF) module and the arithmetic encoder (AE) in EBCOT, so as to increase the performance and cut down the cost. In one preferred embodiment, the CF module is controlled by a finite state machine (FSM) controller to constantly output a valid context and decision pair in each clock cycle, and the arithmetic encoder processes the data by interleaving the inputs. Therefore, the additional first-in first-out (FIFO) buffer is not necessary anymore for the CF module, and each clock cycle can be used efficiently. Besides, the look-ahead approach is not necessary anymore for the arithmetic encoder.

First of all, for the CF module, each code-block is divided into bit-planes and coded starting from the most significant bit-plane (MSB) down towards the least significant bit-plane (LSB). Within a bit-plane, every four rows form a stripe, and the scanning order is stripe by stripe from top to bottom. In every stripe, data are scanned column by column from left to right. But the number of context and decision pairs generated in every stripe is not constant. If the CF module is made to have a constant output rate, the condition of outputting only one context and decision pair has to be considered. Outputting only one context and decision pair may cause the CF module to not have a constant output rate. A non-constant output rate is also known to happen in Run-Length Coding (RLC) of the coding pass, and the decisions in Run-Length Coding are in accordance with the four bits of one column in every stripe. Therefore, the inputs have to be column-based in order to determine the Run-Length Coding conditions in the CF module. After the inputs are decided, a finite state machine (FSM) controller is provided to control the CF module, so that the CF module with a finite state can have a constant valid output in each clock cycle.

Figure 1:
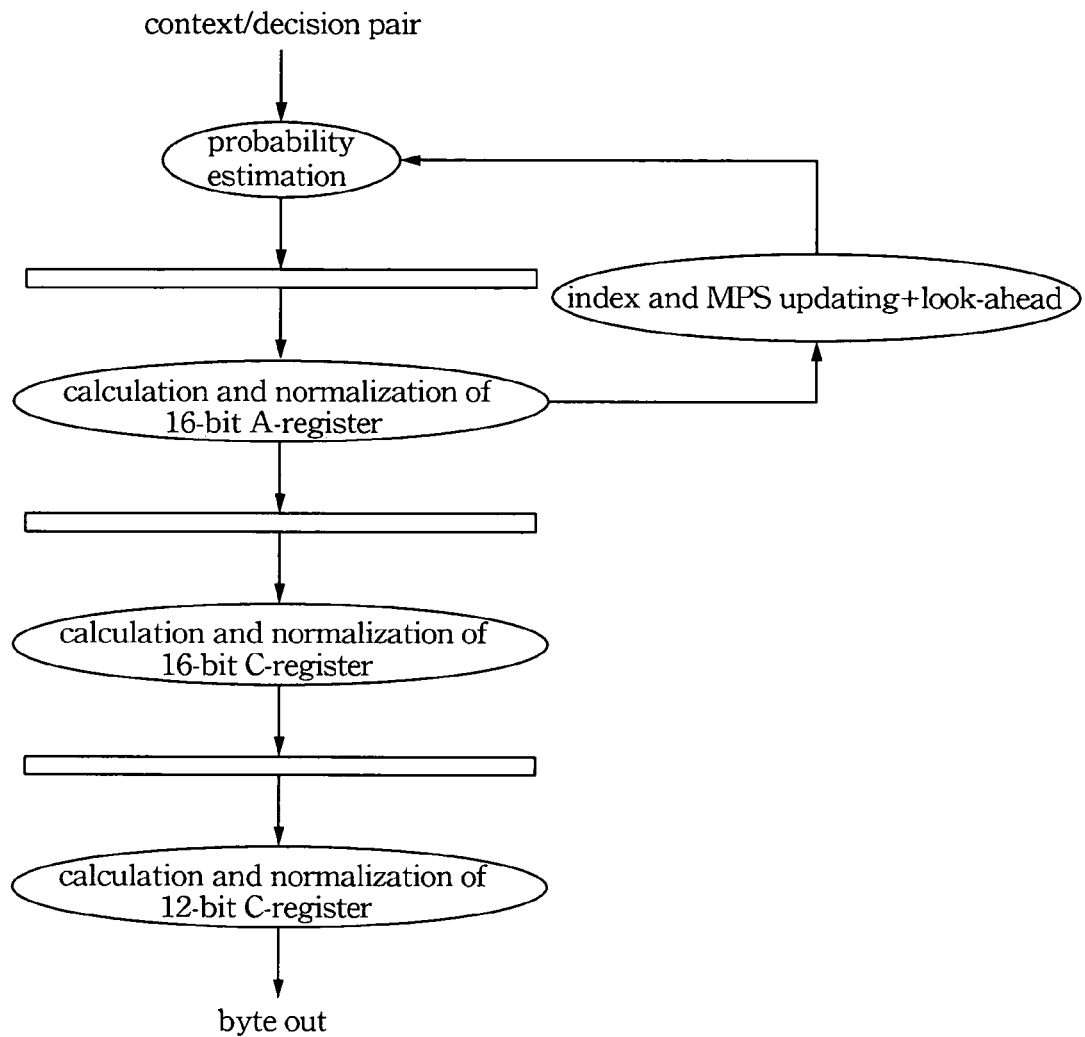
FIG. 1 is a schematic view showing a four-stage pipelined arithmetic encoder in the prior art.
Figure 2:
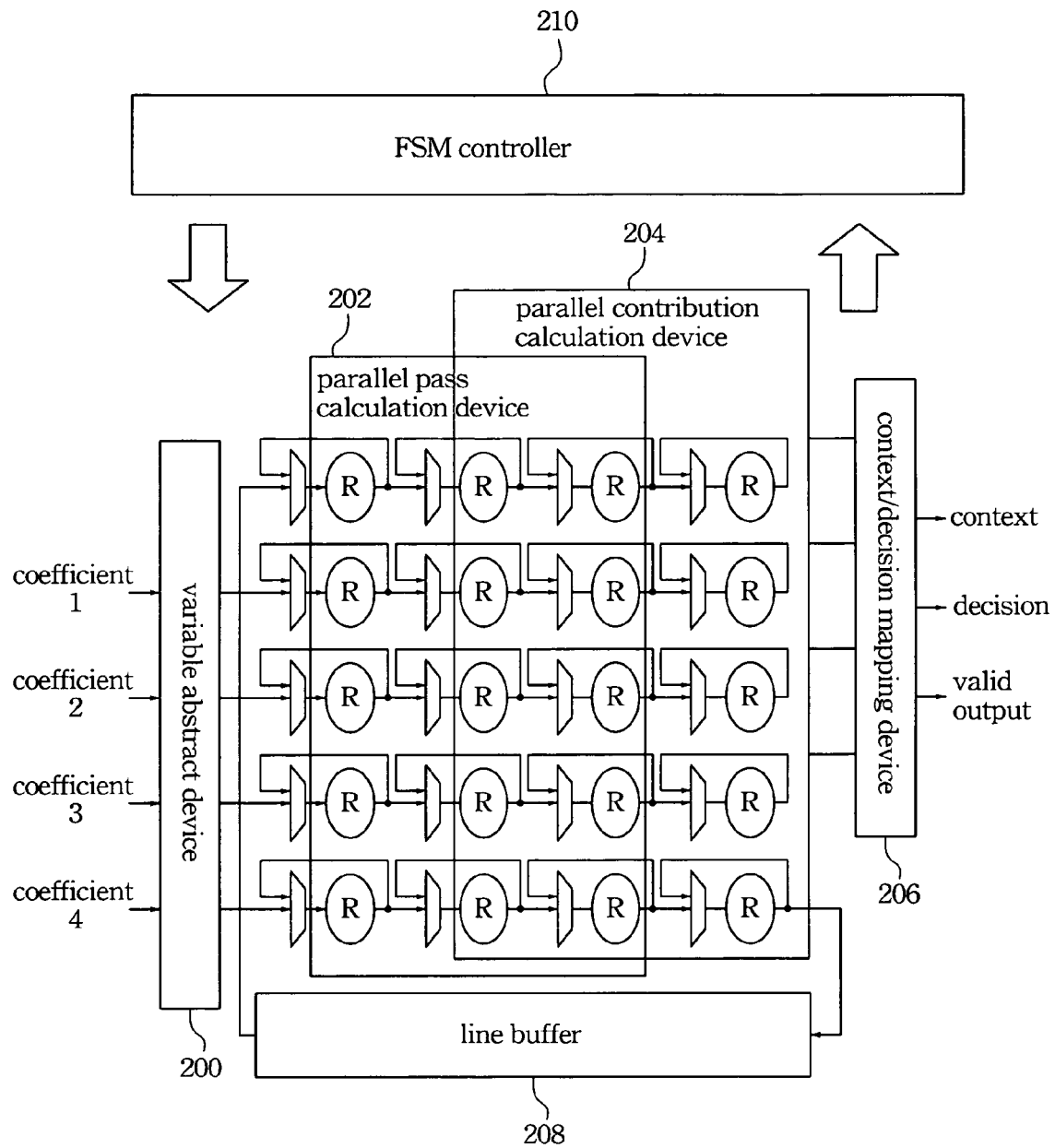
FIG. 2 is a schematic view showing a constant output-rate context formation module according to one preferred embodiment of this invention.

FIG. 2 is a schematic view showing a constant output-rate context formation module according to one preferred embodiment of this invention. Referring to FIG. 2, the CF module includes a variable abstract device, a parallel pass classification device, a parallel contribution calculation device, a context and decision pair mapping device, a line buffer, and a FSM controller. The variable abstract device 200 is used to obtain the signs, $\mu^k$, $\sigma^k$, and $\gamma^k$ of four coefficients of one column within a code-block, wherein k is the k-th bit-plane, $\mu$ is the magnitude, $\sigma$ is the significant state, and $\gamma$ is the first time magnitude refinement coding. Besides, the scripts of those are the same as the hardware description language VHDL as follows:

sign=Coffi [7];
$\mu^k$=Coffi_s[0]; //Coffi_s[6:0] == Coffi[6:0]<<k
$\sigma^k$=|Coffi_s[6:1];
$\gamma^k$=|Coffi_s[6:1]& ~(|Coffi_s[6:2]);

Moreover, the parallel pass classification device 202 and the parallel contribution calculation device 204 are designed to adopt the pass parallel architectures. The context and decision pair mapping device 206 is used to generate the context and decision pairs corresponding to the coded bit, in accordance with a controlling signal, and is practiced according to Boolean logic. In addition, the line buffer 208 is used to store the signs, $\mu^k$, $\sigma^k$, and coding pass of the fourth bit within a stripe, wherein the length of the line buffer 208 is 64 units and the width of every unit is 5 bits. Then, the FSM controller 210 is provided to control the CF module, so that the CF module with a finite state can have a constant valid output in each clock cycle.

On the other hand, for the arithmetic encoder, if the context and decision pairs have to be processed continuously in one pass, the calculation and the normalization operation have to be done during different pipeline stages when the pass parallel architecture is used in the CF module. Therefore, each context and decision pair has to be processed in each clock cycle. As a result, the present invention provides the arithmetic encoder designed to have interleaving inputs, so that two sequential input data have no relations to each other, and the complicated look-ahead approach is not necessary anymore. Besides, each clock cycle can be used more efficiently.

Referring to FIG. 2 again, after the CF module processes the data and then the context and decision pairs are generated from the CF module, the arithmetic encoder is used to encode each bit according to its contexts and output the bit-streams.

Figure 3:
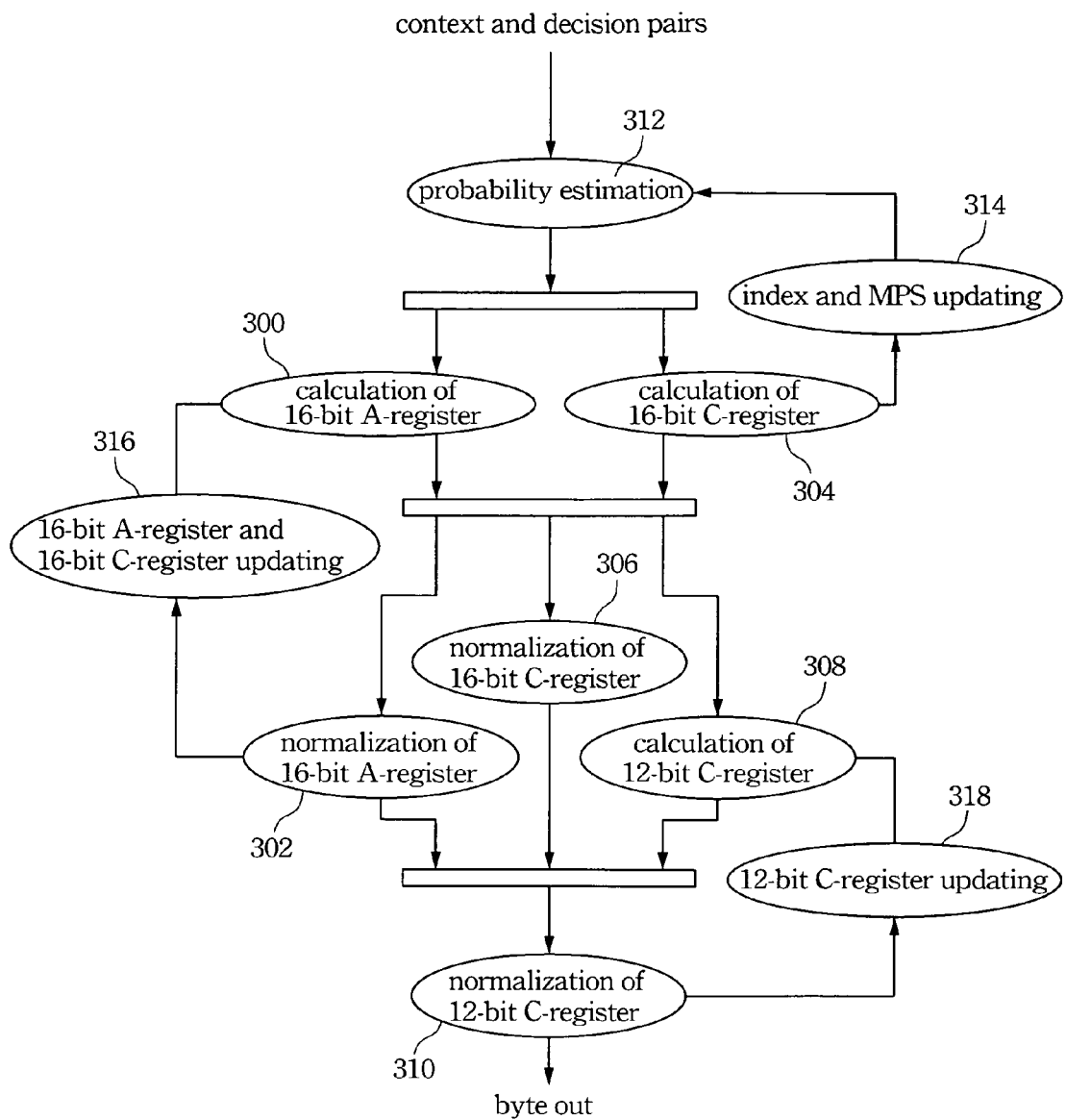
FIG. 3 is a schematic view showing a four-stage pipelined input-interleaved arithmetic encoder according to one preferred embodiment of this invention.

FIG. 3 is a schematic view showing a four-stage pipelined input-interleaved arithmetic encoder according to one preferred embodiment of this invention. Referring to FIG. 3, the calculation and the normalization of the 16-bit A-register are divided into the calculation of the 16-bit A-register 300 and the normalization of the 16-bit A-register 302. The calculation and the normalization of the 16-bit C-register are divided into the calculation of the 16-bit C-register 304 and the normalization of the 16-bit C-register 306. Furthermore, the calculation and the normalization of the 12-bit C-register are divided into the calculation of the 12-bit C-register 308 and the normalization of the 12-bit C-register 310. After that, a four-stage pipelined arithmetic encoder is formed with interleaving inputs.

Referring to FIG. 3 again, the calculation of the 16-bit A-register 300 and the calculation of the 16-bit C-register 304 in the second stage are connected to the probability estimation 312, to send the feedback and update the context and decision pairs by means of index and MPS updating (IMU) 314. Moreover, the normalization of the 16-bit A-register 302 and the normalization of the 16-bit C-register 306 in the third stage are connected to the calculation of the 16-bit A-register 300 and the calculation of the 16-bit C-register 304 in the second stage, to send the feedback and update the context and decision pairs by means of the 16-bit A-register and the 16-bit C-register updating 316. Then, the normalization of the 12-bit C-register 310 in the fourth stage is connected to the calculation of the 12-bit C-register 308 in the third stage, to send the feedback and update the context and decision pairs by means of the 12-bit C-register updating 318. Thus, the look-ahead approach can be replaced and each clock cycle can be used more efficiently. Besides, the path length in this arithmetic encoder is the same as that in the prior art. This arithmetic encoder can also be practiced more easily and increase the performance of EBCOT.

While the exemplary embodiments of the present invention and their advantages have been described in detail, it should be understood that various changes, substitutions and alterations may be made herein without departing from the scope of the invention.

What is claimed is:

1. A data processing method comprising:
inputting column-based data into the context formation module; and
controlling the context formation module with a finite state so that the context formation module has a constant valid output in each clock cycle, wherein the context formation module includes a variable abstract device, a parallel pass classification device, a parallel contribution calculation device, a context and decision mapping device, a line buffer, and a finite state machine controller.

2. The method of claim 1, wherein the variable abstract device is used to obtain signs, $\mu^k$, $\sigma^k$, and $\gamma^k$ of four coefficients of one column within a code-block, wherein k is k-th bit-plane, $\mu$ is magnitude, $\sigma$ is significant state, and $\gamma$ is first time magnitude refinement coding, and scripts of those are the same as hardware description language VHDL.

3. The method of claim 1, wherein the parallel pass classification device and the parallel contribution calculation device are designed to adopt pass parallel architectures.

4. The method of claim 1, wherein the context and decision pair mapping device is used to generate a plurality of context and decision pairs corresponding to a plurality of coded bits, in accordance with a controlling signal, and is practiced according to Boolean logic.

5. The method of claim 1, wherein the line buffer is used to store signs, $\mu^k$, $\sigma^k$, and coding pass of the fourth bit within a stripe, and the length of the line buffer is 64 units and the width of every unit is 5 bits.

6. The method of claim 1, wherein the finite state machine controller is provided to control the context formation module, so that the context formation module with the finite state has the constant valid output in each said clock cycle.

7. The method of claim 1 further comprising:
separating calculation and normalization operation of a plurality of registers into different pipeline stages of an arithmetic encoder; and
interleaving inputs so that two different data are inputted into the arithmetic encoder in one clock cycle difference.

8. The method of claim 7, wherein the plurality of registers include a 16-bit A-register, a 16-bit C-register, and a 12-bit C-register.

9. The method of claim 7, wherein the arithmetic encoder is a four-stage pipelined arithmetic encoder.

10. The method of claim 9, wherein the four-stage pipelined arithmetic encoder has three feedbacks for updating the data.

11. A data processing method in an embedded block coding with optimized truncation module, the method comprising:
inputting column-based data into a context formation module;
controlling the context formation module with a finite state, so that the context formation module has a constant valid output in each clock cycle;
separating calculation and normalization operation of a plurality of registers into different pipeline stages of an arithmetic encoder; and
interleaving inputs so that two different data are inputted into the arithmetic encoder in one clock cycle difference.

12. The method of claim 11, wherein the context formation module includes a variable abstract device, a parallel pass classification device, a parallel contribution calculation device, a context and decision mapping device, a line buffer, and a finite state machine controller.

13. The method of claim 12, wherein the variable abstract device is used to obtain signs, $\mu^k$, $\sigma^k$, and $\gamma^k$ four coefficients of one column within a code-block, wherein k is k-th bit-plane, $\mu$ is magnitude, $\sigma$ is significant state, and $\gamma$ is first time magnitude refinement coding, and scripts of those are the same as hardware description language VHDL.

14. The method of claim 12, wherein the parallel pass classification device and the parallel contribution calculation device are designed to adopt pass parallel architectures.

15. The method of claim 12, wherein the context and decision pair mapping device is used to generate a plurality of context and decision pairs corresponding to a plurality of coded bits, in accordance with a controlling signal, and is practiced according to Boolean logic.

16. The method of claim 12, wherein the line buffer is used to store signs, $\mu^k$, $\sigma^k$, and coding pass of the fourth bit within a stripe, and the length of the line buffer is 64 units and the width of every unit is 5 bits.

17. The method of claim 12, wherein the finite state machine controller is provided to control the context formation module, so that the context formation module with the finite state has the constant valid output in each said clock cycle.

18. The method of claim 11, wherein the plurality of registers include a 16-bit A-register, a 16-bit C-register, and a 12-bit C-register.

19. The method of claim 11, wherein the arithmetic encoder is a four-stage pipelined arithmetic encoder.

20. The method of claim 19, wherein the four-stage pipelined arithmetic encoder has three feedbacks for updating the data.

* * * * *